United States Patent [19]
Furlette et al.

[11] 3,942,338
[45] Mar. 9, 1976

[54] TORQUE LIMITING COUPLING

[75] Inventors: James L. Furlette; Donald A. Stadler, both of Fenton, Mich.

[73] Assignee: Excel Corporation, Fenton, Mich.

[22] Filed: Mar. 4, 1974

[21] Appl. No.: 447,471

[52] U.S. Cl. ............ 64/30 D; 64/11 R; 64/27 NM; 192/56 R
[51] Int. Cl.² .......................................... F16D 7/02
[58] Field of Search... 64/30 D, 30 E, 30 R, 27 NM, 64/27 R, 11 R, 29; 192/56

[56] References Cited
UNITED STATES PATENTS

| | | | |
|---|---|---|---|
| 3,007,652 | 11/1961 | Heckman | 64/30 D |
| 3,618,310 | 11/1971 | Balchunas | 64/30 D |

FOREIGN PATENTS OR APPLICATIONS

| | | | |
|---|---|---|---|
| 922,502 | 7/1949 | Germany | 64/27 NM |
| 1,008,063 | 5/1957 | Germany | 64/27 NM |

*Primary Examiner*—Benjamin W. Wyche
*Assistant Examiner*—Randall Heald
*Attorney, Agent, or Firm*—Gifford, Chandler & Sheridan

[57] ABSTRACT

A torque limiting coupling for transmitting torque to a tubular member from a driving shaft extending axially throughout the tubular member, and more particularly for driving a conveyor roller from a power shaft, the torque limiting coupling comprising the driving shaft having a polygonal peripheral shape about its portion projecting through the tubular member, and an elongated resilient cylindrical member disposed loosely in the tubular member between the peripheral surface of the polygonal portion of the shaft and the inner bore surface of the tubular member, the diameter of the resilient member being larger than the widest distance between the peripheral surface of the polygonal shaft portion and the inner bore surface of the tubular member.

17 Claims, 6 Drawing Figures

U.S. Patent   March 9, 1976   3,942,338
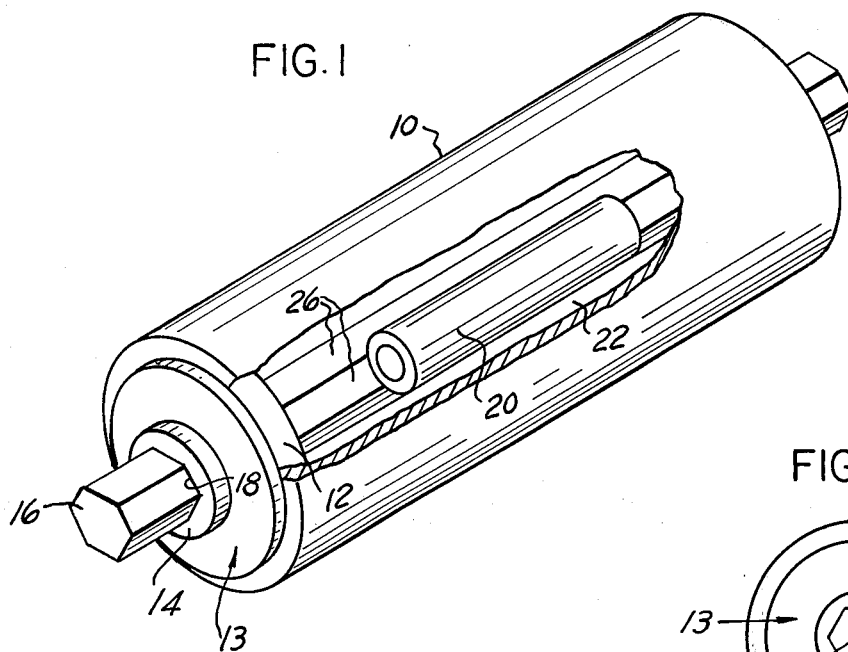
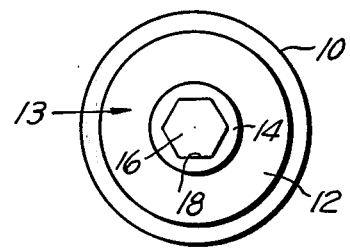
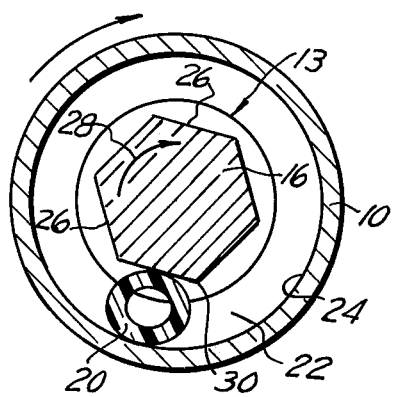
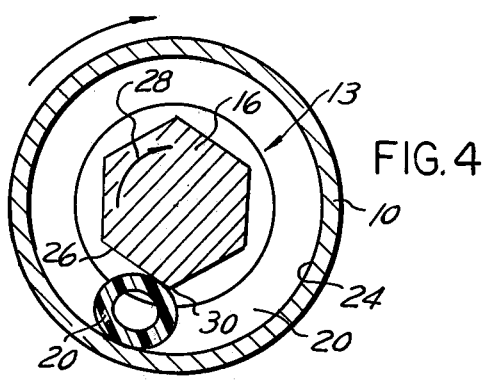
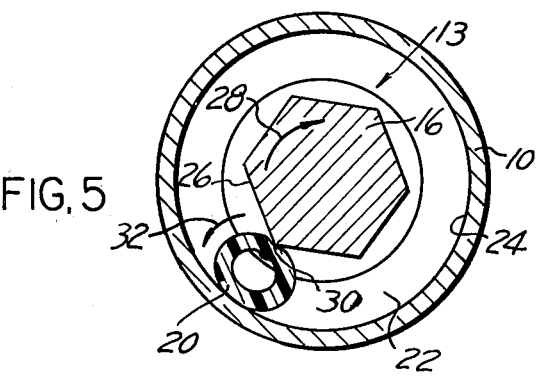
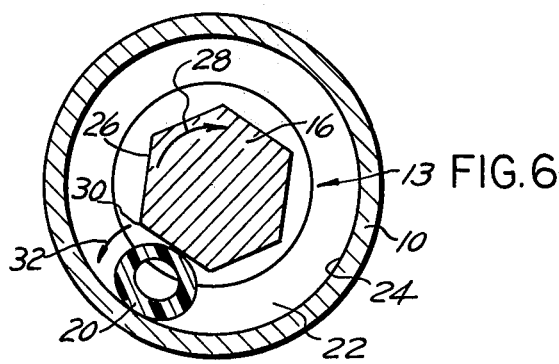

TORQUE LIMITING COUPLING

BACKGROUND OF THE INVENTION

The present invention relates to torque limiting, or torque overload, couplings for transmitting torque and motion from a drive shaft to a tubular member, which is capable of preventing the transmission of excessive torque when such excessive torque may be detrimental to related apparatus, and which is capable of transmitting only insignificant torque and no motion when the driven mechanism becomes frozen through mechanical failure or for any other reason.

Although not exclusively limited to such applications, the torque overload coupling of the invention has particular applications as a coupling for driving a conveyor roller from a power or drive shaft. In a conveyor system, one or more rollers are generally power driven, while a plurality of supporting and guiding rollers, engaging the conveyor belt, are simply supported by appropriate support means for free rotation about their axis. In the event of a jam of the articles transported by the conveyor, damage may result to the articles on the conveyor belt, to the conveyor itself, or to the conveyor driving mechanism, if the conveyor belt is continuously power driven. It is therefore desirable that the conveyor be stopped immediately, either through manual controls, thus necessitating the presence of an operator constantly at the controls, or by means of some automatic device, in order to prevent damage to the articles on the conveyor, to the conveyor itself, or personal injury to personnel. Torque limiting slip clutches and other mechanisms may be used, but torque limiting clutches, automatic torque limiting devices and other automatic shut-off devices are rather complex and costly.

The present invention, by providing a simple torque limiting coupling for driving a conveyor roller from a power shaft, automatically prevents damage in the event of a jam or of an obstruction tending to slow down or stop the motion of the conveyor belt. The present invention also permits the provision of a plurality of drive rollers for a conveyor system capable of individually adapting their respective driving torque to load conditions and to power upsurges, and capable of accepting variations in driving speed from one power shaft to another. Furthermore, the present invention permits tailoring of the torque transmitting factor of the coupling as a function of the physical dimensions of an intermediary coupling member, and as a function of its resiliency. The present invention provides a torque overload coupling utilizing rolling forces and, when operating in a disengaged mode, does not utilize slippage of friction surfaces, or engagement and disengagement of connecting elements, as is generally the case in prior art devices. The invention further provides a simple structure consisting of a single simple intermediary coupling element, and it utilizes substantially the same inventory of parts for making torque transmitting members such as a conveyor drive roller or free-wheeling support elements such as free-wheeling conveyor rollers.

SUMMARY OF THE INVENTION

The many objects and advantages of the present invention are achieved by providing a simple structure consisting of a hollow or tubular driven member coaxially disposed for free rotation about a driving shaft having a portion of peripheral polygonal shape disposed within the tubular member, and an elongated resilient intermediary cylindrical member, of a diameter slightly wider than the maximum space provided between the flat sections of the polygonal shaft, disposed between the polygonal portion of the shaft and the inner bore surface of the tubular member, such that the elongated intermediary member acts as a resilient wedge element transmitting the rotation from the shaft to the tubular member as long as the resistant torque applied to the tubular member does not exceed a predetermined limit. When the torque opposing the rotation of the tubular member exceeds such a limit, the tubular member ceases to rotate and the driving shaft continues to rotate, thus causing the intermediary elongated cylindrical member to roll in the space between the shaft and the inner bore of the stalled tubular member. The resilient intermediary cylindrical member passes through consecutive phases of relative diametrical compressions and expansions while rolling over the edges and the flats of the polygonal driving shaft, respectively.

The many objects, advantages and applications of the present invention will become apparent to those skilled in the art when the following description of an example of the best mode contemplated for practicing the invention is read in conjunction with the accompanying drawings wherein:

BRIEF DESCRIPTION OF THE DRAWINGS

FIG. 1 is a perspective view, with portions broken away to show the internal construction, of an example of application of the invention to a drive roll such as a conveyor drive roll;

FIG. 2 is an end view thereof;

FIGS. 3–4 are each a transverse section thereof, at an enlarged scale, showing the operation of the torque overload couping of the invention in a torque transmitting mode; and FIGS. 5–6 are views similar to FIGS. 3–4 showing the coupling of the invention in a torque overload mode.

DETAILED DESCRIPTION OF THE PREFERRED EMBODIMENT

Referring now to the drawing and more particularly to FIGS. 1 and 2 thereof, the invention is shown embodied in a torque overload coupling, or torque limiting coupling, for a roller such as a conveyor drive roller. The roller consists of a tubular member 10 supported at each end by a generally disc-shaped end member, shown at 12, consisting, for example, of the outer race of an appropriate bearing 13 such as a roller, ball, needle, or plain bearing, the inner race 14 of which is supported by a shaft 16 disposed axially throughout the tubular member 10. In this manner, the tubular member 10 is free to rotate in any direction independently of the shaft 16. When used as part of a conveyor the roller may support and guide a conveyor belt, not shown, a plurality of such rollers being normally disposed and supported by a frame, not shown.

The tubular member 10 is fastened to the end bearing means 13 by any conventional means such as having the outer race 13 of each bearing press-fitted on an end of the tubular member 10, or welded or cemented thereto, and the shaft 16 which, in the example illustrated is shown as being of polygonal shape in cross-section and more specifically as being hexagonal, is passed through the central bore 18 of the bearing inner race 14, appropriate conventional means such as a transversely extending pin or other means being used for holding the shaft 16 against longitudinal displacement relative to the inner race 14.

As shown at FIG. 1 and at FIGS. 3-6, an elongated substantially cylindrical member 20 is disposed in the space 22 formed between the inner bore 24 of the tubular member 10 and the peripheral surface of the shaft 16 extending throughout the tubular member. The elongated intermediary cylindrical member 20 has an outside diameter larger than the widest distance separating the peripheral surface of the shaft 16 and the inner bore surface 24 of the tubular member 10. Such widest distance corresponds to the distance separating the center of a flat face 26 of the shaft 16 to the inner bore surface 24 of the tubular member 10 along a radius of the shaft and tubular member assembly. The elongated intermediary cylindrical member 20 is made of a resilient elastic material, preferably an elastomer such as rubber or a resilient plastic such as polyester, polyethylene, polypropylane, polystyrene, and the like. The elongated intermediary member 20 may also be made of a rod of such elastomer material or, alternatively and preferably, as shown, it may be of a tubular shape.

The shaft 16 is normally power driven in rotation, for example in the direction of the arrow 28, by conventional means such as an electrical gear motor or the like, not shown, and normally drives the tubular member 10 in rotation in the same direction, as shown at FIG. 3, as long as the torque required for driving the tubular member 10 does not exceed a predetermined torque. The drive between the shaft 16 and the tubular member 10 is effected by means of the elongated resilient intermediary member 20 being placed in compression between a flat face 26 of the shaft 16 and the inner bore surface 24 of the tubular member 10, the elongated member acting as a resilient wedge between the shaft flat face 26 and the inner bore surface 24 of the tubular member 10. The greater the load applied to the tubular member 10 opposing the rotation of the tubular member, the greater the intermediary member 20 is compressed and rollingly displaced in a counterclockwise direction, relative to the showing of the drawing, thus rolling closer to an edge 30 between two consecutive flat faces 26 of the shaft 16, as illustrated at FIG. 4. Under those conditions of very small load or, alternatively, of increased load not exceeding the driving torque limit of the coupling of the invention, the shaft 16 and the tubular member 10 are rotating in unison. However, as soon as the load on the tubular member 10 becomes excessive, as such will be the case in the event that a jam occurs in a conveyor system transporting articles, or in the event that for any reason the tubular member 10 is prevented from rotating, the elongated resilient cylindrical intermediary member 20 is caused to roll over and beyond the edge 30 between consecutive faces 26 of the shaft 16, thus permitting the shaft 16 to continue rotating without driving the tubular member 10, as long as the load on the tubular member 10 remains excessive. Under a completely stalled condition, that is under a condition preventing the tubular member 10 from rotating, the shaft 16 continues to rotate by being driven by its driving mechanism, not shown, and the intermediary member 20 rolls in the space 22 between the peripheral surface of the shaft 16 and the inner bore 24 of the tubular member 10, the intermediary member 20 rotating about its axis in the direction of the arrow 32 at FIGS. 5 and 6. In the course of its rolling action between the peripheral surface of the shaft 16 and the inner bore surface 24 of the tubular member, the resilient intermediary member 20 passes through successive phases of maximum radial compression and minimum radial compression while rolling respectively over the edges 30 and the center portion of the flat faces 26 on the shaft 16, as shown respectively at FIG. 5 and FIG. 6. As soon as the tubular member 10 is again free to rotate, the resilient wedging action of the intermediary member 20 is reestablished and the tubular member 10 is again coupled to the driving shaft 16, thus automatically reestablishing the drive of the tubular member.

Although the tubular member 10 has been illustrated with a circularly cylindrical inner bore 24, it will be obvious to those skilled in the art that the shaft 16 may be made with a circularly cylindrical periphery and the tubular member 10 may be made with a polygonal inner bore cross section.

The torque transmitted by the coupling of the invention may be controlled to a desired limit by way of the physical dimensions and the resiliency characteristics of the intermediary member 20. For a given diameter of the intermediary member 20 made of a given material, the limit of the torque transmitted by the coupling is increased as a function of the length of the intermediary member. Thus the torque transmitted can be conveniently varied by simply providing intermediary members of different lengths. By using an intermediary member 20 in the form of a tubular member as illustrated, the transmitted torque limit is furthermore a function of the wall thickness of the intermediary member, for a given material, the length and the diameter of the intermediary member remaining constant. It will be also appreciated that although a single intermediary member 20 has been shown and described, and a single member only is required in most applications, an assembly having a pair or more of such members may be useful for some applications.

It will also be appreciated by those skilled in the art that the torque limiting coupling of the invention has many applications other than for conveyor roller drive.

Having thus disclosed the invention by way of an example of embodiment thereof given for illustrative purposes only, what is claimed as new is as follows:

1. A torque overload coupling for transmitting torque to a tubular member from a driving shaft extending axially throughout said tubular member, said coupling comprising a pair of bearings rotatively supporting said tubular member from said shaft, each of said bearings being disposed at an end of said tubular member, an intermediate portion of said shaft between said bearings having a polygonal shape in cross section, and a circularly cylindrical diametrically resilient elongated member longitudinally disposed in said tubular member between the peripheral surface of said shaft portion of polygonal shape and the inner bore surface of said tubular member and freely rotatable therein, said resilient member having a diameter normally larger than the widest distance between the peripheral surface of said shaft section of polygonal shape and the inner bore surface of said tubular member but being sufficiently resilient to permit said resilient member to roll past points where distance between the peripheral surface of said shaft section and the inner bore surface of said tubular member is the narrowest.

2. The coupling of claim 1 wherein the maximum torque transmitted from said shaft to said tubular member is a function of the length of said resilient member.

3. The coupling of claim 1 wherein the maximum torque transmitted from said shaft to said tubular member is a function of the diameter of said resilient member.

4. The coupling of claim 1 wherein said tubular member has a cylindrically circular inner bore.

5. The coupling of claim 1 wherein said tubular member has a cylindrically circular periphery.

6. The coupling of claim 1 wherein said shaft portion of polygonal shape is hexagonal.

7. The coupling of claim 1 wherein said resilient member is tubular.

8. The coupling of claim 1 wherein the maximum torque transmitted from said shaft to said tubular member is a function of the wall thickness of said tubular resilient member.

9. A torque limiting coupling for driving a conveyor roller from a power shaft, said coupling comprising said roller in the form of a tubular member having an inner cylindrical bore of constant diameter, said shaft extending axially throughout said tubular member, end plate members rotatively and concentrically supporting said tubular member from said shaft disposed each at an end of said tubular member, a portion of said shaft extending between said end plate members having a polygonal shape in cross section, and an elongated diametrically resilient circularly cylindrical member longitudinally disposed in the inner bore of said tubular member and freely rotatable therein, said resilient member being normally diametrically compressed when disposed between a flat surface of the portion of said shaft of polygonal shape and the inner bore of said tubular member but being sufficiently compressible to permit said resilient member to roll completely around the periphery of said shaft.

10. The torque limiting coupling of claim 9 wherein the maximum torque transmitted from said shaft to said tubular member is a function of the length of said resilient member.

11. The torque limiting coupling of claim 9 wherein the maximum torque transmitted from said shaft to said tubular member is a function of the diameter of said resilient member.

12. The torque limiting coupling of claim 9 wherein said shaft portion of polygonal shape is hexagonal.

13. The torque limiting coupling of claim 9 wherein said resilient member is tubular.

14. The torque limiting coupling of claim 13 wherein said tubular resilient member is made of a resilient plastic material.

15. The torque limiting coupling of claim 14 wherein the maximum torque transmitted from said shaft to said tubular member is a function of the wall thickness of said tubular resilient member.

16. A torque overload coupling for transmitting torque to a tubular member from a driving shaft extending axially throughout said tubular member, said coupling comprising a pair of bearings rotatably supporting said tubular member with respect to said shaft, said bearings being disposed at opposite ends of said tubular member, a circularly cylindrical diametrically resilient elongated member longitudinally disposed in said tubular member between the peripheral surface of said shaft portion and the inner bore surface of said tubular member and freely rotatable therein said resilient member having a diameter normally larger than the distance between the peripheral surface of said shaft section and the inner bore surface of said tubular member but being sufficiently compressible to permit said resilient member to roll completely around the periphery of said shaft, the length of said resilient member determining the torque transmitted from said shaft to said tubular member whereby shortening said resilient member provides a reduction in the torque transmitted from said shaft to said tubular member.

17. A torque overload coupling for transmitting torque to a tubular member from a driving shaft extending axially throughout said tubular member, said coupling comprising a pair of bearings rotatably supporting said tubular member with respect to said shaft, said bearings being disposed at opposite ends of said tubular member, a circularly cylindrical diametrically resilient elongated member longitudinally disposed in said tubular member between the peripheral surface of said shaft portion and the inner bore surface of said tubular member and freely rotatable therein, said resilient member having a diameter normally larger than the distance between the peripheral surface of said shaft section and the inner bore surface of said tubular member but being sufficiently compressible to permit said resilient member to roll completely around the periphery of said shaft, the diameter of said resilient member determining the torque transmitted from said shaft to said tubular member whereby replacing said resilient member with another resilient member of a larger diameter provides an increase in the torque transmitted from said shaft to said tubular member.

* * * * *